United States Patent Office 2,776,245
Patented Jan. 1, 1957

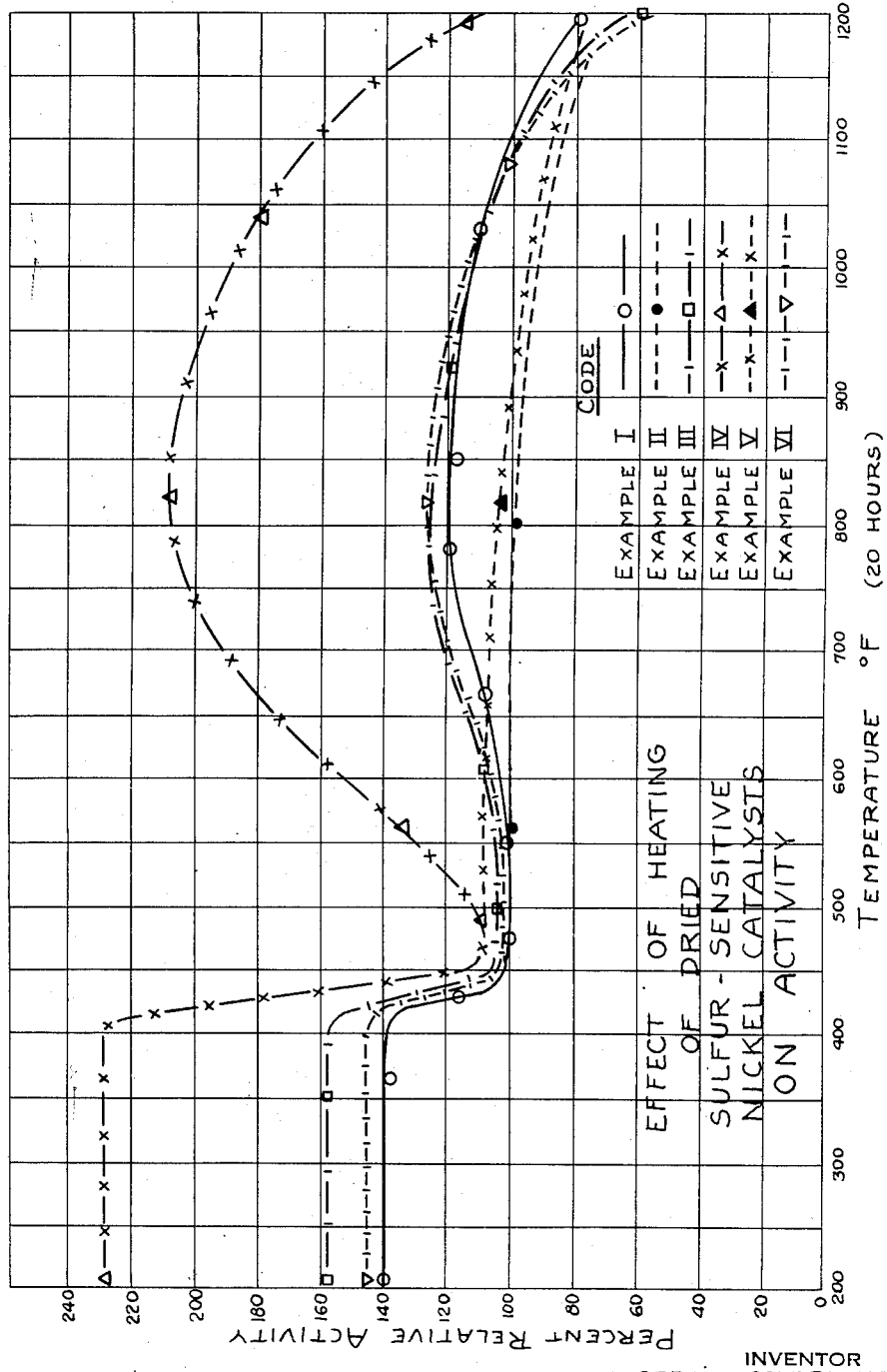

2,776,245

PREPARATION OF NICKEL CARBONATE CATALYSTS AND UTILIZATION THEREOF FOR DESULFURIZATION

Elbert O. Sowerwine, Jr., Wapiti, Wyo., assignor to Wigton-Abbott Corporation, Plainfield, N. J., a corporation of New Jersey Application May 11, 1953, Serial No. 353,992

2 Claims. (Cl. 196—28)

This invention relates to nickel catalysts for use in desulfurizing or hydrofining processes and to the preparation and utilization thereof to provide enhanced desulfurization. More particularly, the invention relates to the preparation and utilization of nickel hydroxide and nickel carbonates as desulfurizing or hydrofining catalysts, and to the active catalytic substances.

In the desulfurization or hydrofining of petroleum and other hydrocarbon distillates various catalytic materials have been employed, the most usual being nickel oxide catalysts comprising NiO, $Ni_2O_3$, or mixtures thereof in varying proportions. In preparing and regenerating such nickel oxide catalysts it has been customary to prepare an intermediate nickel hydroxide or nickel carbonate and then to roast or calcine the intermediate at temperatures generally within the range of about 450–1200° F. to obtain the oxide. In some instances this has been followed by reduction with hydrogen to obtain metallic nickel catalyst.

I have now discovered that nickel hydroxide and nickel carbonates including in particular basic nickel carbonate are effective desulfurizing catalysts in their own right, and that they actually have greater desulfurizing activity than the nickel oxide catalysts heretofore employed. Commercial dry nickel hydroxide and basic nickel carbonate have been found by controlled comparative tests hereinafter described to exhibit from about 15 to 50% greater desulfurizing activity than the nickel oxide catalysts. I have further discovered, however, that when special procedures are followed in preparing nickel hydroxide or nickel carbonate catalysts from nickel sulfate, a normal intermediate in regeneration of spent nickel catalysts, the desulfurizing activity can be increased to approximately twice the activity of the previously available nickel oxide catalysts.

When the specially prepared nickel hydroxide or basic nickel carbonate above described is calcined under specially controlled conditions it is possible to prepare entirely new type catalysts which I have designated nickel peroxide catalysts and which also have desulfurizing activity markedly greater than the activity of previously available nickel oxide catalysts. These nickel peroxide catalysts and the procedures for preparing the same are disclosed and claimed in my co-pending application, Serial No. 353,991, filed May 13, 1953.

These discoveries are of unusual importance in the desulfurizing and hydrofining art since a primary obstacle to the large scale commercial use of sulfur sensitive solids such as nickel oxide catalysts in desulfurization of petroleum and other hydrocarbon distillates has been the rapid inactivation of the catalyst and the time, labor, and expense required for regeneration of active catalyst. The use of nickel hydroxide or basic nickel carbonate catalysts is doubly advantageous since the greater activity means less frequent regeneration and/or more effective desulfurization, and the elimination of the calcining step greatly reduces the time, labor, and expense required for regeneration.

My discoveries with respect to nickel hydroxide, basic nickel carbonate, and the above mentioned nickel peroxides suggest a theoretical explanation of the activity of sulfur sensitive nickel catalysts which I mention at this time as a possible aid in understanding the invention herein disclosed. It is considered that the degree of desulfurizing activity is not dependent merely upon the chemical composition of the catalytic material and the apparent physical form (whether finely divided or of large particle size) but is dependent to an even greater extent upon the spacing of the nickel atoms within the crystal lattice.

In the normal nickel oxides NiO and $Ni_2O_3$ each nickel atom is associated with only one or one and one-half other atoms whereas in the more active nickel hydroxide and basic nickel carbonate each nickel atom is associated with four other atoms in addition to those of hydration. Furthermore, the specially prepared nickel hydroxide and basic nickel carbonate herein disclosed which are more active than the commercial dry compounds, are prepared under conditions tending to hinder molecular rearrangement and favor hydration. These facts all indicate that increased activity accompanies an increase in the number of associated atoms and corresponding wider spacing of the nickel atoms.

In preparing highly active basic nickel catalysts I can react nickel sulfate with any of the readily available water soluble bases including in particular hydroxides and carbonates of ammonia and the alkali metals. From the standpoint of cost and availability sodium hydroxide or carbonates, including the bicarbonate and trona, a naturally occurring sodium sesquicarbonate, are considered preferable. The digestion or reaction between nickel sulfate and the basic component, as well as the subsequent drying of the basic nickel compound, must, however, be carefully controlled to prevent shifting of the catalytic material to the more stable but less active form.

In both the digestion and the drying steps a minimum time-temperature effect is required in order to retard rearrangement of the nickel atoms. In the digestion this means bringing together the nickel sulfate and the base by adding a solution of one component to a boiling solution of the other at as rapid a rate as possible until the amount of basic component is from 100 to 101% of the stoichiometric equivalent of the nickel sulfate. This latter control is of primary importance as a means for controlling the final pH, and increasing the amount of basic component by as little as 1% (to 102% of the stoichiometric equivalent) will seriously impair the activity of the resulting catalyst unless care is taken to buffer the mixture to prevent the pH from getting higher than about pH 9.

Another element of control in the digestion which affects both the physical form of the catalyst and its activity is the order of combining the components. If nickel sulfate solution is added to a boiling solution of the basic component the catalyst will be of a coarse granular character, whereas addition of the basic component to a boiling solution of nickel sulfate will yield a catalyst of extremely fine micro crystalline character, which is generally more practical as it can be easily extruded. The latter procedure also enables the maintaining of pH lower than 9 throughout the digestion or precipitation, whereas in the former procedure the pH is greater than 9 throughout most of the precipitation and the resulting catalyst is somewhat less active.

To provide a minimum time-temperature effect in drying, conditions should be selected which will retard mobility for rearrangement of the nickel atoms. This can be accomplished either by slow low temperature drying atmospheric pressure (quite impractical for a commercial process) or preferably by rapid drying at elevated temperatures and at pressures which will permit the boiling of water at the temperature employed. Temperatures below about 205° F. at a pressure of about 640 mm. Hg and preferably within the range 150 to 200° F. at correspondingly reduced pressures have been found to be most effective. The further lowering of temperature and pressure is without particular advantage.

It should be noted, however, that in varying the drying conditions two factors should be kept in mind as effecting the catalytic activity and physical properties of the catalyst. The time-temperature function controls the catalytic activity. Rearrangement to the closer nickel to nickel lattice spacing is promoted by higher time-temperature conditions; therefore the minimum time-temperature effect will yield the most active catalyst. The physical properties of the catalyst on the other hand are influenced by the volume rate of gas evolution. Too high an evolution rate although not affecting the molecular structure, may literally explode the gross physical structure and produce a catalyst of extremely small particle size. Such finely divided catalyst can be utilized directly in a fluidized desulfurizing process, but would require pelleting or combining with a carrier for use in desulfurizing with a fixed or moving bed of catalyst. If finely divided catalyst of this type is particularly desired, it can be obtained by either spray drying or vacuum drying, both of which will provide a minimum time-temperature effect and a high rate of gas evolution.

During the drying in the 150 to 200° F. range a forced circulation of air or an inert gas such as nitrogen having a low relative humidity may be passed through the material to remove water vapors as they are released. In this way the drying time can be kept at a minimum.

The following examples and the plotted data based thereon as shown in the accompanying drawing are presented to show a number of factors including:

(a) The comparative desulfurizing activity of nickel hydroxide and basic nickel carbonate and the nickel oxide catalysts normally obtained by calcining these materials.

(b) The markedly increased desulfurizing activity of specially prepared catalyst as compared with commercial dry nickel hydroxide and basic nickel carbonate.

(c) The relationship between the specially prepared catalysts of the present invention and the new nickel peroxide catalysts above mentioned which can be obtained therefrom by controlled calcining.

In these examples all tests for activity were carried out by a standardized desulfurizing procedure wherein a definite weight of the same high sulfur containing oil is recirculated through a definite amount of heated catalyst for a definite time under precisely controlled conditions. In other words the only variable in the test is the sample of catalyst being assayed for desulfurizing activity.

The actual test conditions used in these tests are as follows:

Catalyst sample—An amount containing by assay 7.00 gm. of nickel
Oil stock—Commercial No. 3 straight run distillate from predominately Oregon Basin, Wyoming, crude: high in theophenes and very resistant for sulfur removal; containing 2.09% by weight of sulfur
Oil quantity charged—420 gm.
Oil recirculation rate—412 gm. per hour
Catalyst temperature—625° F.
Pressure—640 mm. of Hg (slightly superatmospheric at the place of testing)
Rate of feed of hydrogen gas—2.46 cu. ft. per hour
Exhaust gases—Discharged through ice cooled condenser and pressure regulator
Time of test—6 hours from the time oil first contacts the catalyst
Data to determine—Sulfur content of the oil at the end of the test, from which calculate gm. of sulfur removed per gm. of Ni as a measure of activity In the examples and plotted curves the individual activities obtained in the various test runs have been converted to "percent relative activity" using as 100% the activity of commercial basic nickel carbonate calcined in a nitrogen atmosphere (this corresponding closely with the activity of commercially calcined products).

*Example I*

Commercial dry basic nickel carbonate was weighed out into 10 samples each containing 7.00 gm. of nickel by analysis. Each was placed one at a time in a 8" x 1" diameter chamber in a laboratory muffle furnace and air preheated to furnace temperature in a coil of tubing within the furnace was passed through the chamber at a rate of 2.0 cu. ft. per hour for exactly 20 hours. Each sample was heated to a different temperature within the range 205–1195° F., and at the end of the 20 hour heating was tested for desulfurizing activity by the method above described giving the following results:

| Sample | Temp., °F. | Percent Relative Activity |
|---|---|---|
| 1 | 205 | 140 |
| 2 | 365 | 138 |
| 3 | 430 | 116 |
| 4 | 475 | 100 |
| 5 | 550 | 101 |
| 6 | 665 | 108 |
| 7 | 780 | 120 |
| 8 | 850 | 118 |
| 9 | 1,030 | 110 |
| 10 | 1,195 | 79 |

*Example II*

Two samples of the same material as used in Example I were treated in precisely the same manner with the exception that nitrogen instead of air was circulated through the furnace chamber and the temperatures employed were 560 and 800° F. giving the following results:

| Sample | Temp., °F. | Percent Relative Activity |
|---|---|---|
| 1 | 560 | 100 |
| 2 | 800 | 99 |

(These results are taken as the standard or 100% activity in determining percent relative activity in all other tests.)

*Example III*

Commercial dry nickel hydroxide was weighed out into 7 samples each containing 7.00 gm. of nickel by analysis. These samples were heated and tested for desulfurizing activity according to the procedures described in Example I, but using temperatures ranging from 205 to 1200° F., giving the following results:

| Sample | Temp., °F. | Percent Relative Activity |
|---|---|---|
| 1 | 205 | 157 |
| 2 | 350 | 158 |
| 3 | 500 | 104 |
| 4 | 605 | 108 |
| 5 | 710 | 122 |
| 6 | 925 | 119 |
| 7 | 1,200 | 60 |

*Example IV*

A quantity of basic nickel carbonate was prepared as follows: A solution of nickel sulfate containing 5.28% by weight of nickel was heated to boiling and dilute sodium carbonate solution was added quickly over a five minute period with vigorous agitation until 1% more than the stoichiometric amount had been added. This mixture was separated into two approximately equal portions (a) and (b).

Portion (a) was quickly washed and filtered at a near boiling temperature, and the precipitate of basic nickel carbonate was dried quickly in a 205° F. oven with forced air circulation. The barometric pressure was 625 mm. of Hg and the relative humidity of the air was about 10%, making possible quick low temperature drying.

Seven samples of the dried material were weighed out each containing 7.00 gm. of nickel and these were heated and tested for desulfurizing activity as described in Example I using temperature ranging from 205 to 1190° F., giving the following results:

| Sample | Temp., °F. | Percent Relative Activity |
|---|---|---|
| 1 | 205 | 228 |
| 2 | 490 | 109 |
| 3 | 560 | 134 |
| 4 | 665 | 181 |
| 5 | 820 | 203 |
| 6 | 1,040 | 180 |
| 7 | 1,190 | 116 |

*Example V*

A portion of the dried basic nickel carbonate prepared as described in Example IV containing 7.00 gm. of nickel was heated in the manner described in Example I, except that nitrogen was circulated through the furnace chamber instead of air. The heating was at 815° F., and after 20 hours the material was tested for desulfurizing activity giving a result of 104 as the percent relative activity. (The temperature of heating was selected as approximately the temperature which gave the highest activity of calcined product in Example IV.)

*Example VI*

Portion (b) of the precipitated basic nickel carbonate as obtained in Example IV was made alkaline by the addition of an additional 1% over the stoichiometric amount of dilute sodium carbonate and the mixture was digested at boiling for about 18 hours with occasional addition of water to maintain a reasonably constant liquid level. The precipitate was then washed and filtered and dried at 205° F. but without air circulation, and hence at a slower rate than in Example IV. From this dried material five samples were weighed out each containing 7.00 gm. of nickel and these were heated at temperatures ranging from 205 to 1080° F. and then tested for activity in the manner described in Example I, giving the following results:

| Sample | Temp., °F. | Percent Relative Activity |
|---|---|---|
| 1 | 205 | 145 |
| 2 | 600 | 106 |
| 3 | 700 | 120 |
| 4 | 815 | 127 |
| 5 | 1,080 | 102 |

The foregoing examples and the plotted results in the accompanying drawings serve to demonstrate the following facts:

(a) The nickel hydroxide or basic nickel carbonate is always more active as a desulfurizing catalyst than the most active calcined product that can be produced from it.

(b) Comparison of Examples I and IV in the 200–400° F. range and further comparison of Examples IV and VI show that the conditions employed in the precipitation and drying of the catalyst are critical for obtaining a catalyst of enhanced activity.

(c) Comparison of Examples IV and V show that a highly active basic nickel carbonate can yield low activity oxide rather than high activity peroxides if the proper procedure is not followed during calcining.

The procedure as described in Example IV can be employed in like manner to prepare other basic nickel catalysts of enhanced activity. When sodium hydroxide is employed as the basic component it is particularly important to control the pH both during and after the reaction with nickel sulfate. The final pH can be controlled either by carefully limiting the amount of sodium hydroxide used or by employing a buffer to maintain the final pH below 9. In this way nickel hydroxide of high activity can be prepared which on calcining at about 800° F. in the manner described will also yield a highly active nickel peroxide catalyst.

Sodium carbonate, sodium bicarbonate and sodium sesquicarbonate react with nickel sulfate in much the same manner and in all instances the special conditions during digestion and drying, if adhered to, will yield a highly active nickel carbonate catalyst. It is considered that the most active catalyst obtained with any of these carbonates is probably a basic nickel carbonate. It is to be understood, however, that the expression "a highly active nickel carbonate catalyst" embraces any of the carbonate compounds of nickel wherein the enhanced activity, apparently due to an unnatural wide space of nickel atoms in the crystal lattice, is present.

In summary it should be noted that the following factors are essential for the obtainment of the highly active forms of nickel hydroxide and nickel carbonate catalysts.

(a) Reaction between nickel sulfate and the alkaline material such as sodium carbonate or sodium hydroxide to precipitate the catalyst should be effected as rapidly as possible while maintaining a pH below 9; as by adding the alkaline material with agitation to a boiling solution of the nickel sulfate.

(b) The amount of alkaline material should be within the range of 100–101% of the stoichiometric amount required to react with the nickel sulfate, or any excess suitably buffered to prevent a final pH in excess of 9.

(c) The resulting precipitate should be dried rapidly at a temperature below about 205° F. and pressure below about 640 mm. of Hg, while removing liberated vapors with a forced circulation of a gas such as air or nitrogen which is non-active with the catalyst at the temperature employed; or under other (spray or vacuum drying) conditions which will provide a minimum time-temperature effect.

Failure to control any one of these essential factors may impair the activity in the catalyst. Furthermore, if the initial precipitation is not conducted properly (i. e. if the precipitate does not contain the wide spacing of nickel atoms in the crystal lattice) no amount of special care in the drying will yield the highly active nickel hydroxide or nickel carbonate catalysts.

The activity test procedure above described is generally illustrative of the use of my nickel hydroxide and nickel carbonate catalysts in desulfurizing or hydrofining processes. These catalysts can, for example be utilized in hydrofining processes of the type disclosed in United States patent to Marion H. Gwynn, No. 2,587,149, dated February 26, 1952, and would be distinctly advantageous therein because of their higher desulfurizing activity and less costly regeneration due to the elimination of the calcining step.

As a further illustration of the utilization of my improved catalysts in desulfurization or hydrofining procedures, however, I submit the following comparative example showing desulfurizing efficiency obtained under identical conditions with a commercially available nickel oxide catalyst and basic nickel carbonate catalyst prepared in accordance with the process herein disclosed.

Example VII

In a comparative test between catalyst A, a commercial nickel oxide catalyst containing 53.56% nickel and catalyst B, a basic nickel carbonate catalyst prepared according to the procedure described in Example IV and containing 62.64% nickel were used to desulfurize a commercial No. 3 oil prepared from predominantly Oregon Basin (Wyoming) crude having an initial sulfur content of 2.08% by weight. Quantities of this oil were desulfurized by means of catalysts A and B under the following uniform conditions:

| | |
|---|---|
| Average reactor temperature | 625° F. |
| Average reactor pressure | 12.24 p. s. i. a. |
| Oil rate | 1660 gm./hr. |
| Gas composition | 100% $H_2$ |
| Quantity of catalyst containing | 4221 gm. of Ni. |

Oil was contacted with the separate catalysts under the conditions above described and the desulfurized products separately collected and blended until the blended product in each case contained 1.00% by weight of sulfur. The quantities of oil thus treated divided by the weight of nickel in the catalyst gives a measure of the comparative desulfurizating efficiency, as follows:

| Catalyst: | Efficiency |
|---|---|
| A | 26.37 gm. oil/gm. Ni |
| B | 47.53 gm. oil/gm. Ni |

It is to be understood that my nickel hydroxide and nickel carbonate catalysts can be utilized for desulfurizing or hydrofining either as such or in admixture with other catalytically active or inert material. In particular it is within the scope of my invention to utilize the catalysts in conjunction with an inert support or carrier such as kieselguhr or the like.

Various changes and modifications in the procedure herein described may occur to those skilled in the art, and to the extent that such changes and modifications are embraced by the appended claims, it is to be understood that they constitute part of my invention.

I claim:

1. The process for preparing a nickel desulfurizing catalyst of enhanced activity that comprises reacting a solution of nickel sulfate with a sodium carbonate as rapidly as possible by adding the sodium carbonate with agitation to the boiling nickel sulfate solution until 100 to 101% of the stoichiometrically required amount of sodium carbonate has been added while maintaining the reaction mixture at a pH below pH 9, and rapidly drying the resulting precipitate of a nickel carbonate by heating in a forced circulation of a non-reacting gas at a temperature below about 205° F. and a pressure below about 640 mm. of Hg.

2. In the desulfurization of sulfur containing hydrocarbon fluids by contacting same at elevated temperature with a sulfur sensitive catalytic material, the improvement that comprises employing as the catalytic material a nickel carbonate which has been specially prepared according to the process as defined in claim 1.

References Cited in the file of this patent

UNITED STATES PATENTS

| 1,998,470 | Taylor | Apr. 23, 1935 |
| 2,516,877 | Horne et al. | Aug. 1, 1950 |
| 2,587,149 | Gwynn | Feb. 26, 1952 |
| 2,602,070 | Kirkpatrick | July 1, 1952 |

FOREIGN PATENTS

| 707,449 | Germany | Apr. 24, 1941 |

OTHER REFERENCES

Dean, Nickel Compounds as Catalysts. (Publication) "Industrial and Engineering Chemistry," May 1952, pages 985–987.